US008150687B2

(12) United States Patent
Mori et al.

(10) Patent No.: US 8,150,687 B2
(45) Date of Patent: Apr. 3, 2012

(54) RECOGNIZING SPEECH, AND PROCESSING DATA

(75) Inventors: Shinsuke Mori, Yokohama (JP);
Nobuyasu Itoh, Yokohama (JP);
Masafumi Nishimura, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 901 days.

(21) Appl. No.: 11/000,165

(22) Filed: Nov. 30, 2004

(65) Prior Publication Data
US 2005/0143994 A1    Jun. 30, 2005

(30) Foreign Application Priority Data

Dec. 3, 2003 (JP) ................................ 2003-405223

(51) Int. Cl.
*G06F 17/27* (2006.01)
*G10L 15/00* (2006.01)
*G10L 15/16* (2006.01)
(52) U.S. Cl. ............................. 704/231; 704/9; 704/232
(58) Field of Classification Search .................. 704/235, 704/9, 231–232
See application file for complete search history.

(56) References Cited

U.S. PATENT DOCUMENTS

| | | | | | |
|---|---|---|---|---|---|
| 4,488,243 | A | * | 12/1984 | Brown et al. | 704/241 |
| 5,282,267 | A | * | 1/1994 | Woo et al. | 715/788 |
| 5,327,521 | A | * | 7/1994 | Savic et al. | 704/272 |
| 5,737,485 | A | * | 4/1998 | Flanagan et al. | 704/232 |
| 5,890,177 | A | * | 3/1999 | Moody et al. | 715/210 |
| 5,983,183 | A | * | 11/1999 | Tabet et al. | 704/270 |
| 6,023,675 | A | * | 2/2000 | Bennett et al. | 704/235 |
| 6,098,034 | A | * | 8/2000 | Razin et al. | 704/9 |
| 6,314,397 | B1 | * | 11/2001 | Lewis et al. | 704/235 |
| 6,477,491 | B1 | * | 11/2002 | Chandler et al. | 704/235 |
| 6,593,956 | B1 | * | 7/2003 | Potts et al. | 348/14.09 |
| 6,792,409 | B2 | * | 9/2004 | Wutte | 704/276 |
| 6,820,055 | B2 | * | 11/2004 | Saindon et al. | 704/235 |
| 6,882,971 | B2 | * | 4/2005 | Craner | 704/246 |
| 6,959,074 | B2 | * | 10/2005 | Berstis | 379/202.01 |
| 6,959,095 | B2 | * | 10/2005 | Bakis et al. | 381/122 |
| 7,016,833 | B2 | * | 3/2006 | Gable et al. | 704/209 |
| 7,231,350 | B2 | * | 6/2007 | Gable et al. | 704/250 |

(Continued)

FOREIGN PATENT DOCUMENTS

JP        07-049695        2/1995

(Continued)

OTHER PUBLICATIONS

Brown et al. "Toward Speech as a Knowledge Resource," Ibm Systems Journal, vol. 40, No. 4, pp. 985-1001, 2001.

(Continued)

*Primary Examiner* — Eric Yen
(74) *Attorney, Agent, or Firm* — Wolf, Greenfield & Sacks, P.C.

(57) ABSTRACT

An example embodiment of the invention includes a speech recognition processing unit for specifying speech segments for speech data, recognizing a speech in each of the speech segments, and associating a character string of obtained recognition data with the speech data for each speech segment, based on information on a time of the speech, and an output control unit for displaying/outputting the text prepared by sorting the recognition data in each speech segment. Sometimes, the system further includes a text editing unit for editing the prepared text, and a speech correspondence estimation unit for associating a character string in the edited text with the speech data by using a technique of dynamic programming.

10 Claims, 7 Drawing Sheets

U.S. PATENT DOCUMENTS

| | | | | |
|---|---|---|---|---|
| 7,236,932 B1* | 6/2007 | Grajski | ........................ | 704/277 |
| 7,428,000 B2* | 9/2008 | Cutler et al. | ............... | 348/14.11 |
| 7,624,010 B1* | 11/2009 | Kroeker et al. | ............... | 704/235 |
| 7,966,187 B1* | 6/2011 | Pettay et al. | ................. | 704/270 |
| 2002/0049595 A1 | 4/2002 | Bennett et al. | | |
| 2003/0125940 A1* | 7/2003 | Basson et al. | ................. | 704/231 |

FOREIGN PATENT DOCUMENTS

| | | |
|---|---|---|
| JP | 07-191690 | 7/1995 |
| JP | 08-314494 | 11/1996 |
| JP | 2000-259631 | 9/2000 |
| JP | 2000-352995 | 12/2000 |
| JP | 3173363 | 3/2001 |
| JP | 2001-325250 | 11/2001 |
| JP | 2002-101205 | 4/2002 |
| JP | 2003-177776 | 6/2003 |
| JP | 2003-271182 | 9/2003 |
| JP | 2004-309965 | 11/2004 |

OTHER PUBLICATIONS

"Onsei-ninshiki ni . . . ," Advanced Media, Inc., searched on Nov. 25, 2003.

* cited by examiner

| | | | |
|---|---|---|---|
| 1 | 0:00:04 | LAWYER | Shonin no genzai no kinmusaki wa dochira desho ka.<br>(What is your current business address?) |
| 2 | 0:00:08 | WITNESS | Tama chuo keisatsu desu.<br>(It is the Tama Central Police.) |
| 3 | 0:00:10 | LAWYER | Tama chuo keisatsusho deno shonin no shokumu naiyo wo shiri dake masu ka.<br>(Please only know me your job content at the Tama Central Police Station.) |
| 4 | 0:00:16 | WITNESS | Genzai fukusho cho desu.<br>(I am the deputy chief now.) |
| 5 | 0:00:17 | LAWYER | Kaikyu wa nan desho ka.<br>(What is your rank?) |
| 6 | 0:00:18 | WITNESS | Keishi desu.<br>(I am an inspector.) |
| 7 | 0:00:20 | LAWYER | Kore made ni, keisatsu honbu no kotsu kansei ka to iu busho ni kinmu shita koto arimasu...<br>(Have you ever worked for the department called the traffic control division at the police headquarters?) |
| 8 | 0:00:26 | WITNESS | Gozaimasu.<br>(Yes, I have.) |
| 9 | 0:00:27 | LAWYER | Kanseikan ni wa itsu goro kara itsu goro made kin seki mashita ka.<br>(From when to when did you kin seki at the controller?) |
| 10 | 0:00:32 | WITNESS | Heisei nana-nen san-gatsu kara heisei kyu-nen san-gatsu made no ni-nenkan de.<br>(For two years from March, 1995 to March, 1997.) |
| 11 | 0:00:37 | LAWYER | Kotsu kansei ka dewa, shonin wa donoyona tachiba de, donoyona shigoto wo tanto sarete....<br>(At the traffic control division, what kind of position did you hold, and what kind of work were you in charge of?) |
| 12 | 0:00:44 | WITNESS | Shingoki shisetsu tanto kanri kan to shite, shingoki no sekkei keikaku ga.<br>(As an administrator in charge of traffic signal equipment, a design plan for the traffic signal.) |
| 13 | 0:00:50 | WITNESS | Shingoki ni tomonau kotsu kisoku no jimu wo tanto shite orimashita.<br>(I was in charge of clerical work of traffic regulations associated with the traffic signal.) |
| 14 | 0:00:54 | LAWYER | Kono sosho no genkoku no hase-san ga, gochonan no kotsu jiko ni kanshi mashite...<br>(Regarding the traffic accident of the eldest son, Mr.(Mrs.) Hase who is the claimer of this lawsuit...) |
| 15 | 0:00:59 | LAWYER | Kamikawa-bashi no kosaten no shingoki ga hosha-bunri de areba, jiko wa okora nakatta to...<br>(The traffic accident would not have occurred if the traffic signal at the intersection of Kamikawa Bridge had displayed signals separately for pedestrians and vehicles...) |
| 16 | 0:01:08 | WITNESS | Haishite orimasu.<br>((Something) is disposed.) |
| 17 | 0:01:11 | LAWYER | Kono hon ken no, kotsu jiko no ato ni, genkoku no hase-san ga, keisatsu ni taishite, kami...<br>(After the traffic accident of this prefecture, Mr.(Mrs.) Hase who is the claimer (made some actions) to the police...) |
| 18 | 0:01:24 | WITNESS | Hai i. Hachioji keisatsusho ni nanboku oginatta ri, kotsu kansei ka ni ichido o mie ni na...<br>(Yess, he/she supplemented south and north to the Hachioji Police Station, and paid a visit to the traffic control division once...) |
| 19 | 0:01:34 | LAWYER | Honken no kamikawa-bashi kosaten nan desu kedomo, kono kosaten ni, shingoki wo hajimete secchi...<br>(Regarding the intersection of Kamikawa Brige in this case, (when was) the traffic signal placed for the first time?) |
| 20 | 0:01:44 | WITNESS | Showa gojukyu-nen ni secchi shita to kiite imasu.<br>(I have heard that it was placed in 1984.) |
| 21 | 0:01:48 | LAWYER | Kamikawa-bashi kosaten no shingoki no seigyo hoshiki nan desu kedomo, donoyona hoshiki shoka<br>(Regarding the control system of the traffic signal at the intersection of Kamikawa Bridge, what kind of system is extinguishment?) |
| 22 | 0:01:55 | WITNESS | Nigenji hoshiki de unyo shite orimasu.<br>(It is operated by the two-aspect system.) |
| 23 | 0:01:58 | LAWYER | Ha, ima, nigenji hoshiki to iu koto wo shogen sare mashita kedomo, jinji to iu nowa...<br>(Wave, now, you testified that it was the two-aspect system, but regarding personnel affairs...) |

RECOGNIZING SPEECH, AND PROCESSING DATA

FIELD OF THE INVENTION

The present invention relates to a speech recognition system and, more particularly, to a system and method for recognizing speech recorded in special circumstances such as a court and a conference and for preparing a document.

BACKGROUND OF THE INVENTION

As a speech recognition technology has been progressed and precision thereof has been improved, an application field thereof has been being greatly expanded, and the speech recognition technology has begun to be utilized for preparation for documents by dictation, the documents including business documents, medical charts, legal documents, and subtitles for television broadcasting. Moreover, it has been conceived to introduce a transcription technology using the speech recognition in a court, a conference and the like in order to prepare an investigation of a court and the minutes of a conference in a manner that the proceedings are recorded and the recording is transcribed into text.

The following documents are considered:
(Non-Patent Document 1) "Onsei-ninshiki ni yoru kakiokoshi-shisutemu no goshokai (Introduction of Rewrite System by Speech Recognition)," [online], Advanced Media, Inc., [searched on Nov. 25, 2003], Internet <url: http://www.advanced-media.co.jp/event/news/AmiVoice_Rew riter.pdf>
(Non-Patent Document 2) E. W. Brown et al., "Toward speech as knowledge resources," IBM Sys. Journal, Vol. 40, No. 4, pp. 985-1001, 2001, Internet <url: http://www.research.ibm.com/journal/sj/404/brown.pdf>

Conventionally, as the transcription technologies using the speech recognition of such a type, there have been one which recognizes, for each channel, speeches recorded in multi channels, manages the speeches along time by adding channel (that is, speaker) IDs to the multi channels, and displays a text transcript (for example, refer to Non-Patent Document 1); one which associates entire text obtained by the speech recognition with original speeches and makes it possible to reproduce the associated speeches by designating the text (for example, refer to Non-Patent Document 2); etc.

As described above, the speech recognition technology has been utilized for transcribing spoken speeches into text, and in some cases, the original speeches are reproduced and compared with the transcribed text for reasons of the study, verification and the like of the contents. In order to cope with such cases, each of the conventional technologies described above has a function to manage the prepared text and the original speeches in association with each other.

However, in the case of performing transcription from spoken speeches into text in order to prepare an investigation in a court or the minutes in a conference, the speeches in the court or conference become free speeches. Accordingly, unlike a written language and recitation speech of reading a draft aloud, the transcribed text is made of a spoken language, includes many restatings, repetitions and the like, and thus becomes difficult to read. Hence, when such a type of transcription into text is performed, it is necessary to modify the prepared text to one easy to read.

On the other hand, also when the modified text is read, there is a conceivable case where the original spoken speeches are desired to be listened to again in order to guess the mental situation of the speaker. For this purpose, it is advantageous that the modified text be associated with the original speeches in a proper unit such as for each speaker.

As described above, each of the conventional technologies described in Non-Patent Documents 1 and 2 and the like has the function to manage the text prepared through the speech recognition and the original speeches in association with each other. However, this function has a principal object to reproduce the speeches and allow them to be listened to again for the purpose of studying and verifying the contents. In this function, it is not considered to associate the modified text with the original speeches.

Moreover, the speeches in a court and a conference have features as described below.
  Questions and answers occupy major part of a dialogue, and a questioner and an answerer do not change their places sequentially.
  One speaker makes a speech at a time except for sudden speeches such as heckling and hooting, and therefore the speeches are seldom mutually overlapped.
  The order of questioners is determined, and it is rare to question at a time a plurality of persons who will answer. Therefore, in many cases, answers regarding the same topic are dispersed in various portions in speech data.
  However, in the aforementioned conventional technologies, techniques of managing and outputting data have not been suitable for such special circumstances as described above because the conventional technologies have been generally made applicable to various speech circumstances.

SUMMARY OF THE INVENTION

In this connection, it is an aspect of the present invention to provide a data processing method which, even in the case where text transcribed by speech recognition has been modified, is capable of properly associating the modified text with original speeches, and to provide a system using the data processing method.

Moreover, it is another aspect of the present invention to provide a data processing method which is suitable to tran2scribe speeches acquired in special circumstances such as a court and a conference into text, and to provide a system using the data processing method.

The present invention to achieve the foregoing aspects is realized as a speech recognition system configured as below. This system comprises: a microphone for acquiring speech data; a speech recognition processing unit for specifying speech segments for the speech data acquired by the microphone, recognizing a speech in each of the speech segments, and associating a character string of obtained recognition data with the speech data for each speech segment, based on information on a time of the speech; a text preparation unit for sorting the recognition data in each speech segment obtained through the processing by the speech recognition processing unit in accordance with the time information and thus preparing text; and an output control unit for displaying/outputting the text prepared by the text preparation unit. Moreover, the output control unit reproduces the speech data corresponding to the designated recognition data in the text, the recognition data being designated using the speech segment as a unit.

Here, more advantageously, a plurality of the microphones are prepared in accordance with the number of speakers, and the speech recognition processing unit processes speeches acquired by the plurality of microphones for each channel, and imparts to the recognition data in each channel identification information for identifying a speaker associated with the channel. Then, the output control unit retrieves, from the text, the recognition data of the same speaker specified by the identification information and reproduces the speech data corresponding to the retrieved recognition data.

Moreover, the output control unit retrieves, from the text, the recognition data including a specific phrase and reproduces the speech data corresponding to the retrieved recognition data.

Furthermore, the above speech recognition system can be configured to further comprise: a text editing unit for editing the text prepared by the text preparation unit; and a speech correspondence estimation unit for associating a character string in the text edited by the text editing unit with the speech data. In this configuration, the output control unit displays/outputs the text edited by the text editing unit.

Moreover, the speech correspondence estimation unit matches pieces of the text before and after editing by the text editing unit with each other by means of dynamic programming to estimate a correspondence between the pieces of the text and, based on a result of the estimation, associates the speech data in association with the character string of the recognition data in the text before editing with the text after editing.

More specifically, for the operations of substitution, insertion and deletion of a character by the text editing unit, the speech correspondence estimation unit defines a distance scale for evaluating a difference between patterns of the character strings before and after editing, and matches the character strings with each other. Moreover, the speech correspondence estimation unit matches the character strings with each other by using a local path constraint allowing the presence of a character which does not have a correspondence in the character strings before and after editing by editing means.

The speech recognition system thus configured can be used as an electronic investigation preparation system for recognizing spoken speeches recorded for each channel from microphones prepared individually for attendants, for example, a judge, a prosecutor, a lawyer and a defendant at a court, and thus preparing an electronic investigation.

Moreover, in another aspect, the present invention to achieve the foregoing aspects is also realized as a data processing method, as described below, for processing speech data by using a computer. Specifically, this data processing method comprises the steps of: specifying speech segments for speech data acquired by speech inputting means, and recognizing a speech in each of the speech segments; associating a character string of obtained recognition data with the speech data for each speech segment, based on information on a time of the speech; and sorting the obtained recognition data in the speech segments in accordance with the time information and thus preparing text.

More specifically, the step of recognizing a speech includes the steps of: recognizing speeches acquired by a plurality of microphones prepared in accordance with the number of speakers; comparing speech powers in respective channels with one another on a time axis, and specifying speech segments for each of the channels; and applying the specified speech segments to results of recognizing the speeches in the respective channels, specifying the recognition data for each of the speeches of the speakers corresponding to the respective channels, and imparting identification information of the speakers to the recognition data.

Furthermore, this data processing method can be configured to further comprise the steps of: editing the text prepared by the step of preparing text; and matching a character string in the edited text with the character string before editing by means of dynamic programming to estimate a correspondence between the character strings, and associating the edited character string with the speech data based on a result of the estimation.

Moreover, the present invention is also realized as a program for controlling a computer to realize the functions in the aforementioned speech recognition system, or as a program for controlling the computer to execute processing corresponding to the steps in the aforementioned data processing method. This program can be provided in a manner of being stored in a magnetic disk, an optical disk, a semiconductor memory or another recording medium and then distributed or in a manner of being distributed through a network.

BRIEF DESCRIPTION OF THE DRAWINGS

For a more complete understanding of the present invention and the advantages thereof, reference is now made to the following description taken in conjunction with the accompanying drawings.

FIG. 4 is a view showing an example of a text display screen displayed on a display device by an output control unit of this embodiment.

DETAILED DESCRIPTION OF THE INVENTION

The present invention provides data processing methods, apparatus and systems which, even in the case where text transcribed by speech recognition has been modified, are capable of properly associating the modified text with original speeches, and to provide a system using the data processing method.

The present invention also provides data processing methods which are suitable to transcribe speeches acquired in special circumstances such as a court and a conference into text, and to provide a system using the data processing method.

In an example embodiment, the present invention is realized as a speech recognition system configured as below. This system comprises: a microphone for acquiring speech data; a speech recognition processing unit for specifying speech segments for the speech data acquired by the microphone, recognizing a speech in each of the speech segments, and associating a character string of obtained recognition data with the speech data for each speech segment, based on information on a time of the speech; a text preparation unit for sorting the recognition data in each speech segment obtained through the processing by the speech recognition processing unit in accordance with the time information and thus preparing text; and an output control unit for displaying/outputting the text prepared by the text preparation unit. Moreover, the output control unit reproduces the speech data corresponding to the designated recognition data in the text, the recognition data being designated using the speech segment as a unit.

Here, more advantageously, a plurality of the microphones are prepared in accordance with the number of speakers, and the speech recognition processing unit processes speeches acquired by the plurality of microphones for each channel, and imparts to the recognition data in each channel identification information for identifying a speaker associated with the channel. Then, the output control unit retrieves, from the text, the recognition data of the same speaker specified by the identification information and reproduces the speech data corresponding to the retrieved recognition data.

Moreover, the output control unit retrieves, from the text, the recognition data including a specific phrase and reproduces the speech data corresponding to the retrieved recognition data.

Furthermore, the above speech recognition system can be configured to further comprise: a text editing unit for editing the text prepared by the text preparation unit; and a speech correspondence estimation unit for associating a character string in the text edited by the text editing unit with the speech data. In this configuration, the output control unit displays/outputs the text edited by the text editing unit.

Moreover, the speech correspondence estimation unit matches pieces of the text before and after editing by the text editing unit with each other by means of dynamic programming to estimate a correspondence between the pieces of the text and, based on a result of the estimation, associates the speech data in association with the character string of the recognition data in the text before editing with the text after editing.

More specifically, for the operations of substitution, insertion and deletion of a character by the text editing unit, the speech correspondence estimation unit defines a distance scale for evaluating a difference between patterns of the character strings before and after editing, and matches the character strings with each other. Moreover, the speech correspondence estimation unit matches the character strings with each other by using a local path constraint allowing the presence of a character which does not have a correspondence in the character strings before and after editing by editing means.

The speech recognition system thus configured can be used as an electronic investigation preparation system for recognizing spoken speeches recorded for each channel from microphones prepared individually for attendants, for example, a judge, a prosecutor, a lawyer and a defendant at a court, and thus preparing an electronic investigation.

Moreover, the present invention is also realized as data processing methods, as described below, for processing speech data by using a computer. Specifically, a data processing method comprises the steps of: specifying speech segments for speech data acquired by speech inputting means, and recognizing a speech in each of the speech segments; associating a character string of obtained recognition data with the speech data for each speech segment, based on information on a time of the speech; and sorting the obtained recognition data in the speech segments in accordance with the time information and thus preparing text.

More specifically, the step of recognizing a speech includes the steps of: recognizing speeches acquired by a plurality of microphones prepared in accordance with the number of speakers; comparing speech powers in respective channels with one another on a time axis, and specifying speech segments for each of the channels; and applying the specified speech segments to results of recognizing the speeches in the respective channels, specifying the recognition data for each of the speeches of the speakers corresponding to the respective channels, and imparting identification information of the speakers to the recognition data.

Furthermore, this data processing method can be configured to further comprise the steps of: editing the text prepared by the step of preparing text; and matching a character string in the edited text with the character string before editing by means of dynamic programming to estimate a correspondence between the character strings, and associating the edited character string with the speech data based on a result of the estimation.

Moreover, the present invention is also realized as a program for controlling a computer to realize the functions in the aforementioned speech recognition system, or as a program for controlling the computer to execute processing corresponding to the steps in the aforementioned data processing method. This program can be provided in a manner of being stored in a magnetic disk, an optical disk, a semiconductor memory or another recording medium and then distributed or in a manner of being distributed through a network.

A particularly advantageous embodiment for carrying out the present invention (hereinafter, referred to as an embodiment) will be described below in detail with reference to the accompanying drawings.

Figure 1:
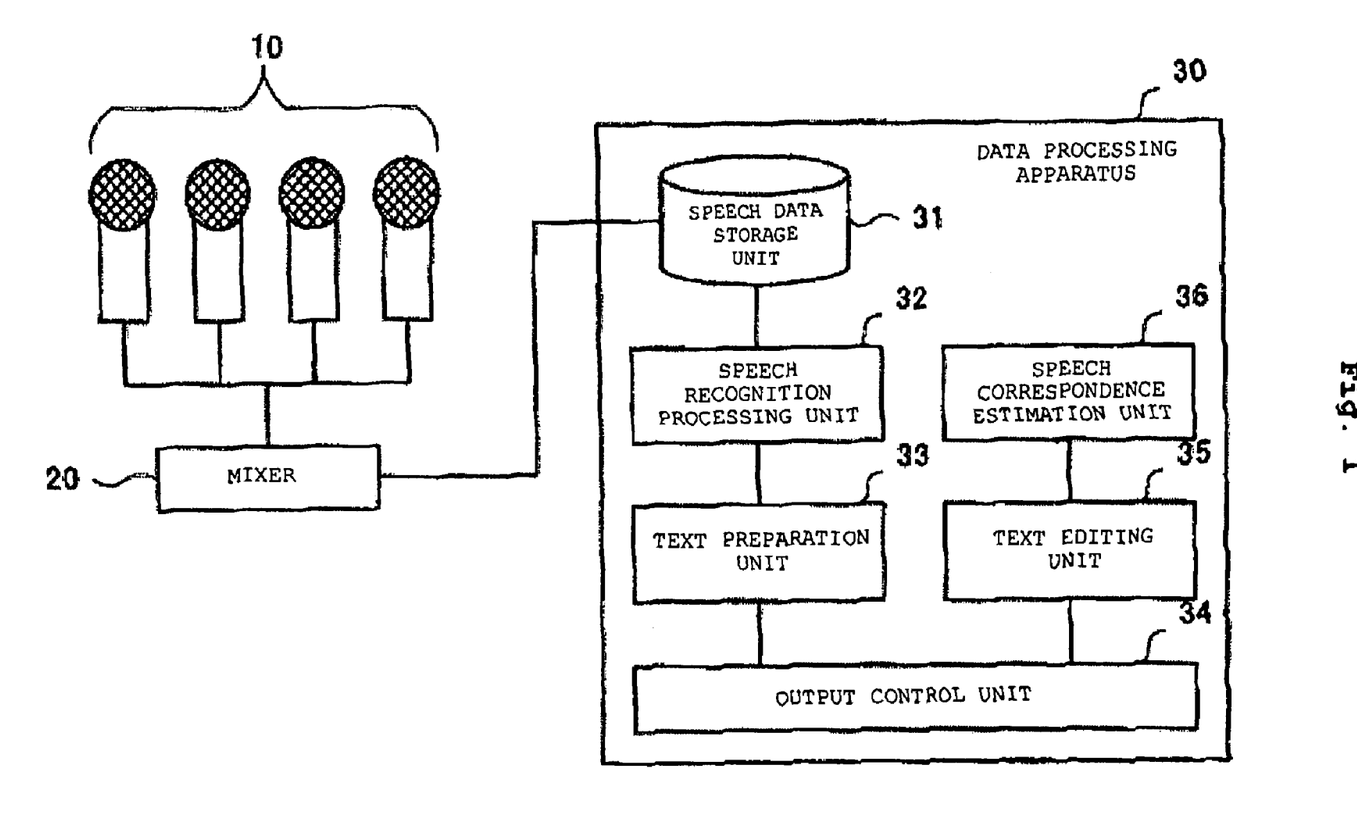
FIG. 1 is a view showing an entire configuration of a speech recognition system according to this embodiment.

FIG. 1 is a view showing an entire configuration of a speech recognition system according to this embodiment. Referring to FIG. 1, the system of this embodiment is configured by including a single microphone 10 or a plurality of microphones 10 and a mixer 20 for recording speeches, and a data processing apparatus 30 for processing speech data acquired by the microphone or microphones 10 and the mixer 20.

The microphone(s) 10 and the mixer 20 can be configured arbitrarily. However, this embodiment is premised on the assumption that speeches are recorded in special circumstances such as a court, a conference or the like, and accordingly, it is advantageous that the microphone(s) 10 and the mixer 20 be configured in accordance with this assumption. Concretely, the circumstances assumed as a recording environment of the speeches by the system of this embodiment have the following features.

Questions and answers occupy major part of a dialogue, and a questioner and an answerer do not change their places sequentially.

One speaker makes a speech at a time except for there being sudden and exceptional speeches, and therefore the speeches are seldom mutually overlapped.

The order of questioners is determined, and it is rare to question at a time a plurality of persons who will answer. Accordingly, in many cases, answers regarding the same topic are dispersed in various portions in speech data.

Therefore, in this embodiment, the microphones 10 are advantageously prepared for speakers individually, and for each channel, one of the speakers is specified. For example, in a court, a judge, a prosecutor, a lawyer and a witness are allowed to individually use the respective microphones 10, and the speakers of speeches acquired by the microphones 10 are respectively specified. The following should be noted. Although individual roles such as a questioner and an answerer are determined in a dialogue, a person who is playing any of the roles is replaced by another in some cases, for example, as in the cases where a plurality of questioners sequentially make questions, and on the contrary, where a plurality of answerers sequentially make answers. In such cases, the microphone 10 may be provided for each of the roles, and for each channel, the role of a speaker may be specified. For example, in a conference, when a speaker's seat is determined, it is satisfactory if the microphones 10 are placed on the speaker's seat and a chairman's seat. In the description below, it is assumed that the dedicated microphones 10 are individually prepared for a plurality of speakers and the speeches of the speakers are individually recorded for the respective channels.

The mixer 20 mixes the speeches acquired by the microphones 10 and sends the mixed speeches to the data processing apparatus 30.

The data processing apparatus 30 performs speech recognition processing of the speech data acquired by the microphones 10 and the mixer 20, transcribes the speech data into text, and displays/outputs the prepared text. Moreover, the data processing apparatus 30 reproduces the recorded speech data.

Figure 2:
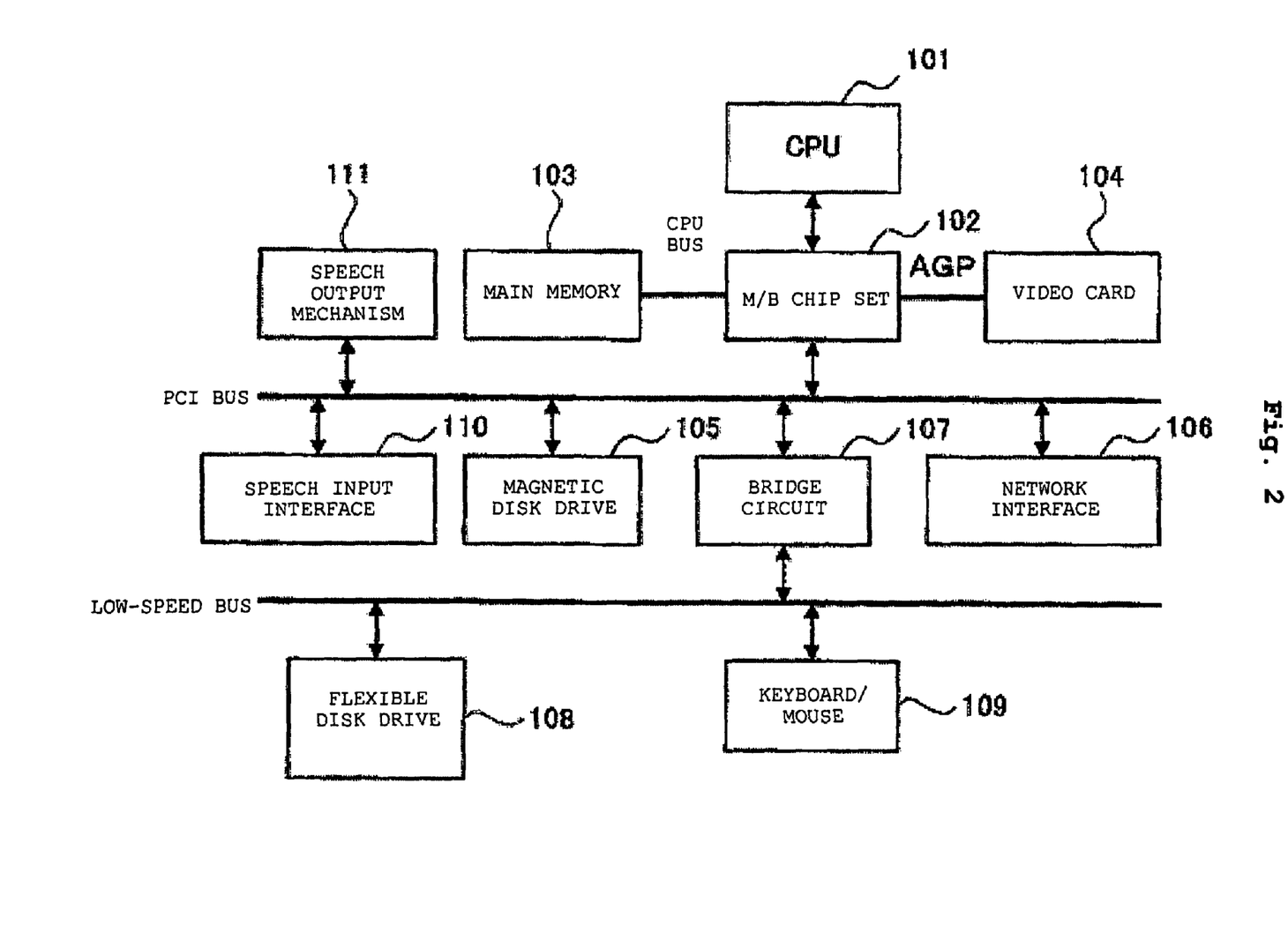
FIG. 2 is a view schematically showing an example of a hardware configuration of a computer apparatus advantageous for realizing a data processing apparatus of this embodiment.

FIG. 2 is a view schematically showing an example of a hardware configuration of a computer apparatus advantageous to realize the data processing apparatus 30 of this embodiment. The computer apparatus shown in FIG. 2 includes a CPU 101, a main memory 103, a video card 104, a magnetic disk drive (HDD) 105, a network interface 106, a flexible disk drive 108, a keyboard/mouse 109, a speech input interface 110, and a speech output mechanism 111. The CPU 101 is operation means. The main memory 103 is connected to the CPU 101 through an M/B (motherboard) chip set 102 and a CPU bus. Similarly, the video card 104 is connected to the CPU 101 through the M/B chip set 102 and an AGP (accelerated graphics port). The magnetic disk drive 105 and the network interface 106 are connected to the M/B chip set 102 through a PCI (peripheral component interconnect) bus. The flexible disk drive 108 and the keyboard/mouse 109 are connected to the M/B chip set 102 through the PCI bus, a bridge circuit 107 and a low speed bus such as an ISA (industry standard architecture) bus. The speech input interface 110 receives an input from the mixer 20. The speech output mechanism 111 is formed of a loudspeaker, a DA (digital-to-analog) converter, and the like.

Note that FIG. 2 only illustrates the hardware configuration of the computer apparatus to realize this embodiment and that other various configurations can be adopted if this embodiment is applicable thereto. For example, a configuration may be adopted in which only a video memory is mounted instead of providing the video card 104, and image data is processed by the CPU 101. Moreover, as an external storage device, a CD-R (compact disc recordable) drive, a DVD-RAM (digital versatile disc random access memory) drive or the like may be provided through an interface such as an ATA (AT attachment) or a SCSI (small computer system interface).

In practice, the speech input interface 110 is composed of an interface such as a USB (universal serial bus) or a line-in jack depending on a connection specification with the mixer 20. Furthermore, although the computer apparatus of FIG. 2 has been described here as the hardware to realize the data processing apparatus 30, the data processing apparatus 30 can also be configured to mount thereon hardware having a function of the mixer 20 or configured to directly receive speech signals acquired by the microphones 10 by realizing the function of the mixer 20 by means of software. Moreover, the microphones 10 can also be composed of microphones built in the computer apparatus, depending on an environment in which this embodiment is used.

As shown in FIG. 1, the data processing apparatus 30 of this embodiment includes a speech data storage unit 31 for storing the recorded speech data, and as functions to perform the transcription into the text by performing the speech recognition, includes a speech recognition processing unit 32, a text preparation unit 33, and an output control unit 34. Moreover, the data processing apparatus 30 includes a text editing unit 35 for performing editorial work of the text, and a speech correspondence estimation unit 36 for estimating a correspondence between the recorded speech data and the text. In this embodiment, the following processes are independent of each other, which are: a process of performing the transcription into the text by performing the speech recognition and of outputting the transcribed text; and a process of editing the text and estimating the correspondence between the edited text and the speech data. Hence, a set of the speech recognition processing unit 32, the text preparation unit 33 and the output control unit 34 and a set of the text editing unit 35 and the speech correspondence estimation unit 36 may be realized by separate pieces of hardware. Alternatively, depending on circumstances to which this embodiment is applied, it is also possible for the data processing apparatus 30 to include only the set of the speech recognition processing unit 32, the text preparation unit 33 and the output control unit 34.

The speech data storage unit 31 is realized, for example, by the main memory 103 and the magnetic disk drive 105 in the computer apparatus shown in FIG. 2. The speech data storage unit 31 receives the speech signals acquired by the microphones 10 through the mixer 20 and the speech input interface 110 and stores speech data (for example, PCM (pulse code modulation) data) subjected to AD (analog-to-digital) conversion.

The speech recognition processing unit 32 is realized, for example, by the CPU 101 under program control in the computer apparatus shown in FIG. 2, and performs the speech recognition processing by reading out the speech data stored in the speech data storage unit 31. As techniques of the speech recognition, the existing techniques for audio processing and language decoding can be applied. This embodiment is premised on the assumption that the speeches are recorded in the special circumstances such as a court, a conference or the like. Turns of the speakers and speeches are specified by utilizing a specialty of this speech recording environment, and results of the speech recognition are processed.

As mentioned above, the speech recording environment to be a subject of this embodiment has the following features.

Questions and answers occupy major part of a dialogue, and a questioner and an answerer do not change their places sequentially.

One speaker makes a speech at a time except for there being sudden and exceptional speeches, and therefore the speeches are seldom mutually overlapped.

These features mean that it is easy to identify the speakers, and that the turns of the speeches are distinct. Accordingly, the speech recognition processing unit 32 first reads the speech data from the speech data storage unit 31 and performs the speech recognition on each of the channels. Moreover, the speech recognition processing unit 32 compares speech powers of the respective channels with one another on a time axis, and specifies speech segments for each of the channels. In order to specify the speech segments, since the speeches of the speakers who correspond to the other channels are mixed into the speech data of each channel, it is necessary to identify which channel's speaker makes the speech by comparing the speech power of each channel with another.

Thereafter, the speech recognition processing unit 32 applies the obtained speech segments to speech recognition results of each channel, and obtains data of the recognition result (hereinafter, referred to as recognition data) in each speech segment for each channel (that is, for each speaker). Then, identification information of the speakers specified by the channels (hereinafter, referred to as speaker IDs) and time information specifying the speech segments (hereinafter, referred to as time indices) are imparted to the recognition data in each speech segment, and the recognition data is sorted for each turn in the dialogue. Hence, recognition data of continuous speeches spoken by one speaker will be included in one turn. Note that, for the speaker IDs, identification information of the microphones 10 (microphone numbers) which have received the speeches of the speakers concerned can also be used. Moreover, for the time indices, for example, the earliest time in each segment can be used.

In order to obtain the recognition data for each speech segment, as described above, the speech recognition is performed on each channel, and the recognition data is applied to the speech segments obtained from the comparison of the powers of the speech data. In addition to this, the speech segments can be specified in advance for each channel from the comparison of the powers of the speech data in the respective channels, and the speech recognition can be executed on the speech data in the speech segment concerned.

Figure 3:
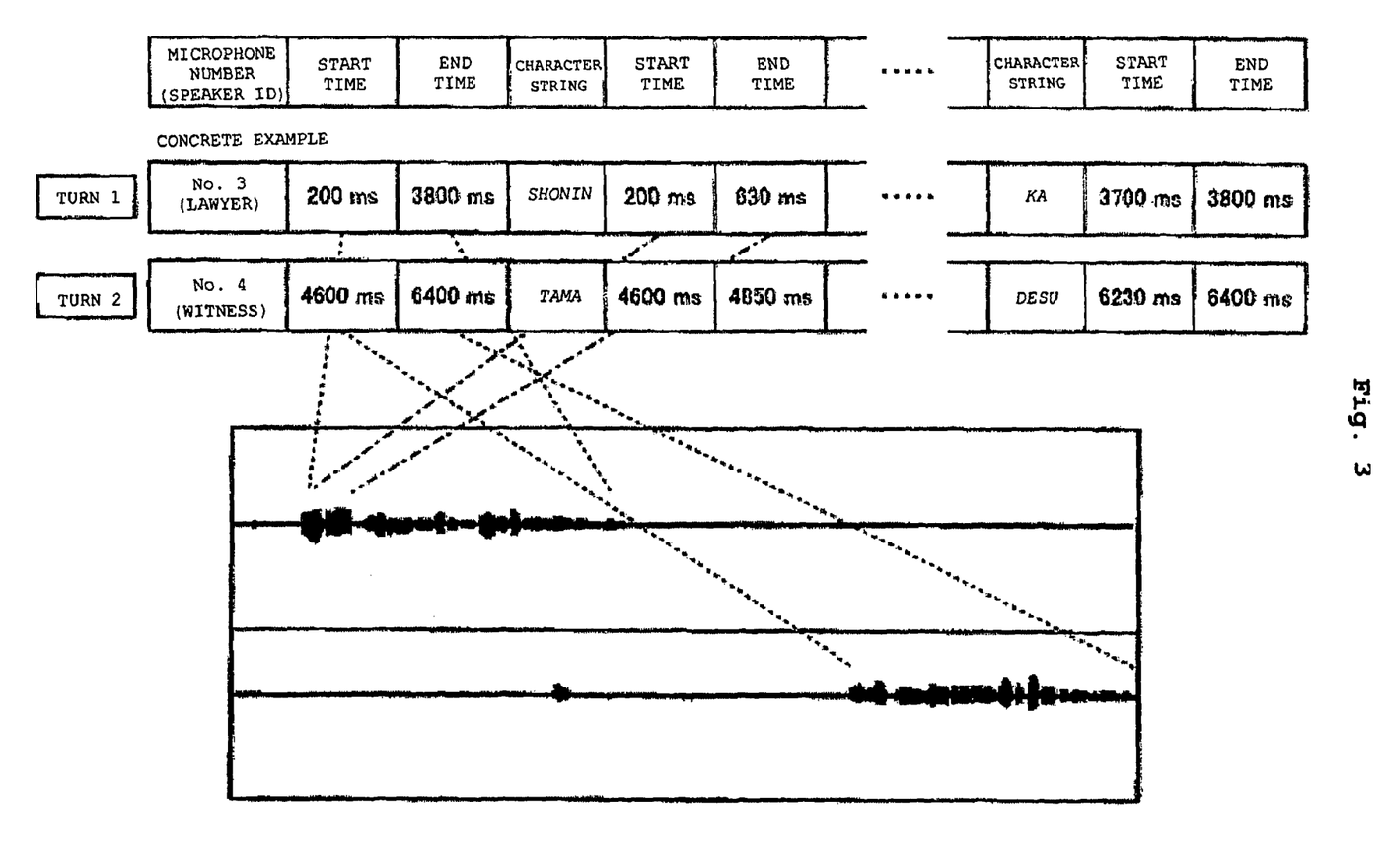
FIG. 3 is a view showing a data structure of recognition data stored for each turn in this embodiment.

FIG. 3 is a view showing a data structure of the recognition data to be stored for each turn. As shown in FIG. 3, the recognition data for each turn includes a speaker ID, start and end times of the entire turn of the recorded speech data, a character string as a recognition result in the turn, and start and end times of the speech data of each word in the character string. For example, in FIG. 3, the data of Turn 1 is recorded in a manner that the speaker ID is "lawyer," the start time of the turn is 200 ms (milliseconds), and the end time of the turn is 3800 ms, and for a word "shonin" in the speech, the start time is 200 ms and the end time is 630 ms. In other word, the recognition data is data representing a character string obtained by the speech recognition and is data representing a correspondence between the character string and the speech data.

The time information (start time and end time) obtained from the time frame of the speech data recorded in small units, for example, for each word, is imparted to the character strings which are the recognition results, and the character strings are associated with the speech data. Thus, a speech corresponding to an arbitrary spot in the turn can be immediately specified. Note that the start time of the entire turn shown in FIG. 3 can be used as the aforementioned time index.

The recognition data thus prepared is stored and held in storing means such as the main memory 103 and the magnetic disk drive 105 shown in FIG. 2. The text preparation unit 33 is realized, for example, by the CPU 101 under program control in the computer apparatus shown in FIG. 2. The text preparation unit 33 sorts the recognition data processed by the speech recognition processing unit 32, based on the time indices, and prepares text in a fixed format. This text is used as a document of a so-called primary transcript, for example, for an investigation in a court or the minutes in a conference. Moreover, the prepared text is stored and held in the storing means such as the main memory 103 and the magnetic disk drive 105 shown in FIG. 2.

The output control unit 34 is realized, for example, by the CPU 101 under program control in the computer apparatus shown in FIG. 2. The output control unit 34 displays the text prepared by the text preparation unit 33 on a display device through the video card 104, and controls the speech output mechanism 111 to reproduce the speech data stored in the speech data storage unit 31.

FIG. 4 is a view showing an example of a text display screen displayed on the display device by the output control unit 34. Here, text of an investigation in a court is displayed. Referring to FIG. 4, the text is sorted into turns and numbers are added to the respective turns. For each turn, the time index, the speaker ID, and the character string of the recognition data which is speech contents, are displayed. As described above, one turn includes the recognition data of the speeches spoken by one speaker, and accordingly, the speeches of the lawyer and witness are repeated almost alternately for each turn.

Moreover, the text displayed on the display device has a role of the indices for the speech data. Specifically, the character strings of the recognition data are associated with the speech data by the time information as described above, and accordingly, when an arbitrary turn is designated, speech data corresponding to the recognition data of the turn can be specified. Therefore, when a predetermined turn is designated and a speech reproduction instruction is inputted from inputting means such as the keyboard, the output control unit 34 reads speech data corresponding to the designated turn from the speech data storage unit 31. Then, the output control unit 34 reproduces the read speech data and outputs the speech data through the speech output mechanism 111 shown in FIG. 2. Furthermore, as shown in FIG. 3, in the recognition data of each turn, each word is associated with the speech data, and accordingly it is possible to designate only a portion, for example, of "genzai no kinmusaki (in English, current business address)" in the speeches of Turn 1 in FIG. 4, and to reproduce a speech corresponding to this portion.

Incidentally, as mentioned above, the speeches in the special speech recording environment as in a court or conference, which is a subject of this embodiment, have features as follows.

A Questioner and an answerer do not change their places sequentially.
The order of the questioners is determined, and it is rare to question at a time a plurality of persons who will answer.
In many cases, answers regarding the same topic are dispersed in various portions in speech data.

In consideration of these features, the output control unit 34 has functions to display a plurality of related turns in a group and to continuously reproduce speech data corresponding to such related turns.

For example, the questioner and the answerer alternately appear, and their places are not changed. Therefore, when turns having the same speaker ID continue, it can be conceived that actual speeches are a continuous one even though the turns are recognized as separate turns because the speech has been interrupted during the speech recognition. For this reason, it is defined that continuous turns having the same speaker IDs can be handled collectively, and the speeches are reproduced continuously.

Moreover, in many cases, the answers regarding the same topic are dispersed in various portions in the speech data, and accordingly, it is conceivable that a turn including a keyword strongly related to a specific topic is of a speech related to the topic. Therefore, an input of the keyword is received from an input device such as the keyboard, turns including the keyword are collected and displayed in a group, and speeches are reproduced continuously.

Furthermore, regardless of whether the speeches are continuous or not, turns having a specific speaker ID are collected from the entire text and displayed in a group, and speeches are reproduced continuously, thus making it possible to examine all of the speeches made by a specific speaker in a court or conference.

The text displayed on the display device, which has undergone the stages described thus far, is one obtained by mechanically carrying out the speech recognition processing on the recorded speeches and by processing the recognition data for each turn. Hence, there is a possibility that a speech recognition error is included in the text. In the example of FIG. 4, for example, speech content (recognition data) of the witness in Turn 16 to a question of the lawyer in Turn 15 is represented in Japanese as "haishite orimasu" (in English, "(something) is disposed"). However, this is an error for "hai, shite orimasu" (in English, "yes, I do it"). Besides such an error, the text obtained by performing the speech recognition on free speech is made of a spoken language and includes many restations and repetitions. Accordingly, it cannot be said that the text is easy to read. Therefore, it is necessary to modify the text to make the text useful as an investigation or minutes and easy to read.

The text editing unit 35 is realized, for example, by the CPU 101 under program control in the computer apparatus shown in FIG. 2. The text editing unit 35 edits the text prepared by the text preparation unit 33 in accordance with the operation of a user. Text editorial functions of the text editing unit 35 can be provided by an existing text editor or word processor. By operating the inputting means such as the keyboard and using the editorial functions of the text editing unit 35, the user can modify an error in a character string in the recognition data, delete an unnecessary phrase in the restations and repetitions, and add a phrase which a character string in the recognition data lacks to come across. The edited text is stored and held in the storing means such as the main memory 103 and the magnetic disk drive 105 shown in FIG. 2.

The speech correspondence estimation unit 36 is realized, for example, by the CPU 101 under program control in the computer apparatus shown in FIG. 2. When the text is edited by the text editing unit 35, the speech correspondence estimation unit 36 associates the character string of the edited text with the speech data. With regard to the recognition data obtained directly from the speech data by the speech recognition processing unit 32, as described above, each word in each character string can be associated with the speech data. However, in the character string of the text edited by the text editing unit 35, a word which is present in the speech data is lost, and on the contrary, a word which is not present in the speech data is included. Therefore, the character string as it is cannot be associated with the speech data. For this reason, a correspondence between the edited text and the recognition data (or the text before editing) is estimated by the speech correspondence estimation unit 36, and thus the character strings in the edited text are associated with the speech data.

The estimation of the correspondence between the edited text and the recognition data, which is performed by the speech correspondence estimation unit 36, is performed by using a matching technique of dynamic programming (hereinafter, abbreviated as DP).

Figure 5:
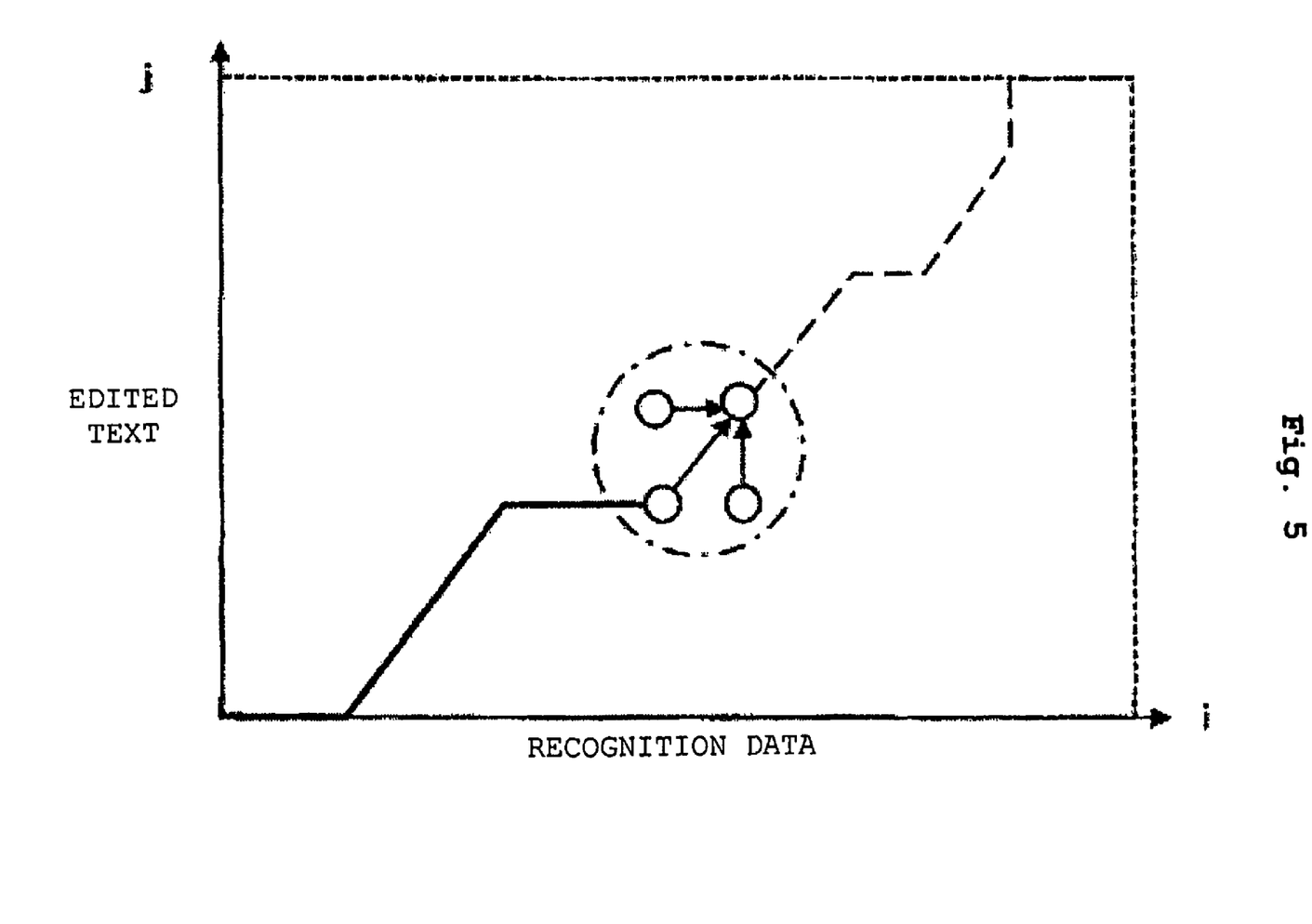
FIG. 5 is a view for explaining estimation of a correspondence between recognition data and edited text, the estimation being performed by DP matching.

FIG. 5 is a view for explaining the estimation of the correspondence between the recognition data and the edited text, which is performed by using the DP matching.

In the special circumstances such as a court, which is a subject of this embodiment, as described above, the turns of the speeches are distinct, and the order of the questions and answers is hardly shifted. Hence, it is conceived that the time information in the turns can be inherited for the most part even if the text is modified to a great extent. For this reason, in this embodiment, unconstrained DP is carried out on the character string of the recognition data and the character string of the edited text for each turn. For the purpose of performing the DP matching, for substitution, insertion or deletion of a character in the editing of the text, a distance scale is defined which is a scale for evaluating a difference between character string patterns before and after editing. Although these distances can reflect a tendency of reflection errors, here, the value for each of the substitution, insertion and deletion is simply set to 1.

Moreover, in order to allow the editing such as deleting and inserting a plurality of continuous character strings, as shown in FIG. 5, a local path constraint is adopted (refer to the arrows in three directions, illustrated in a range surrounded by a circle of the one-dot chain line). The local path constraint allows the presence of a character which does not have a correspondence (for example, a character which was present in the character string before editing and is not present in the character string after editing, or, on the contrary, a character which was not present in the character string before editing and is present in the character string after editing only). The calculation of the distance of the location path is represented as in the following Equation 1.

$$g(i, j) = \min\begin{pmatrix} g(i-1, j) \\ g(i-1, j-1) \\ g(i, j-1) \end{pmatrix} + d(i, j) \qquad \text{[Equation 1]}$$

Here, d(i, j) is a distance on a matching route for the insertion, deletion or substitution of a character at coordinates (i, j), and g(i, j) is a minimum accumulated distance to the coordinates.

If this minimum accumulated distance is sequentially calculated from the start point to end point of the turn, then the minimum accumulated distance on an optimum matching path between the start and end points is obtained as g(I, J) at the end point. Moreover, in order to estimate the optimum matching path, it is satisfactory that back pointers are provided and stored when selecting each location path, and that the back pointers are traced from the end point toward the start point.

Figure 6:
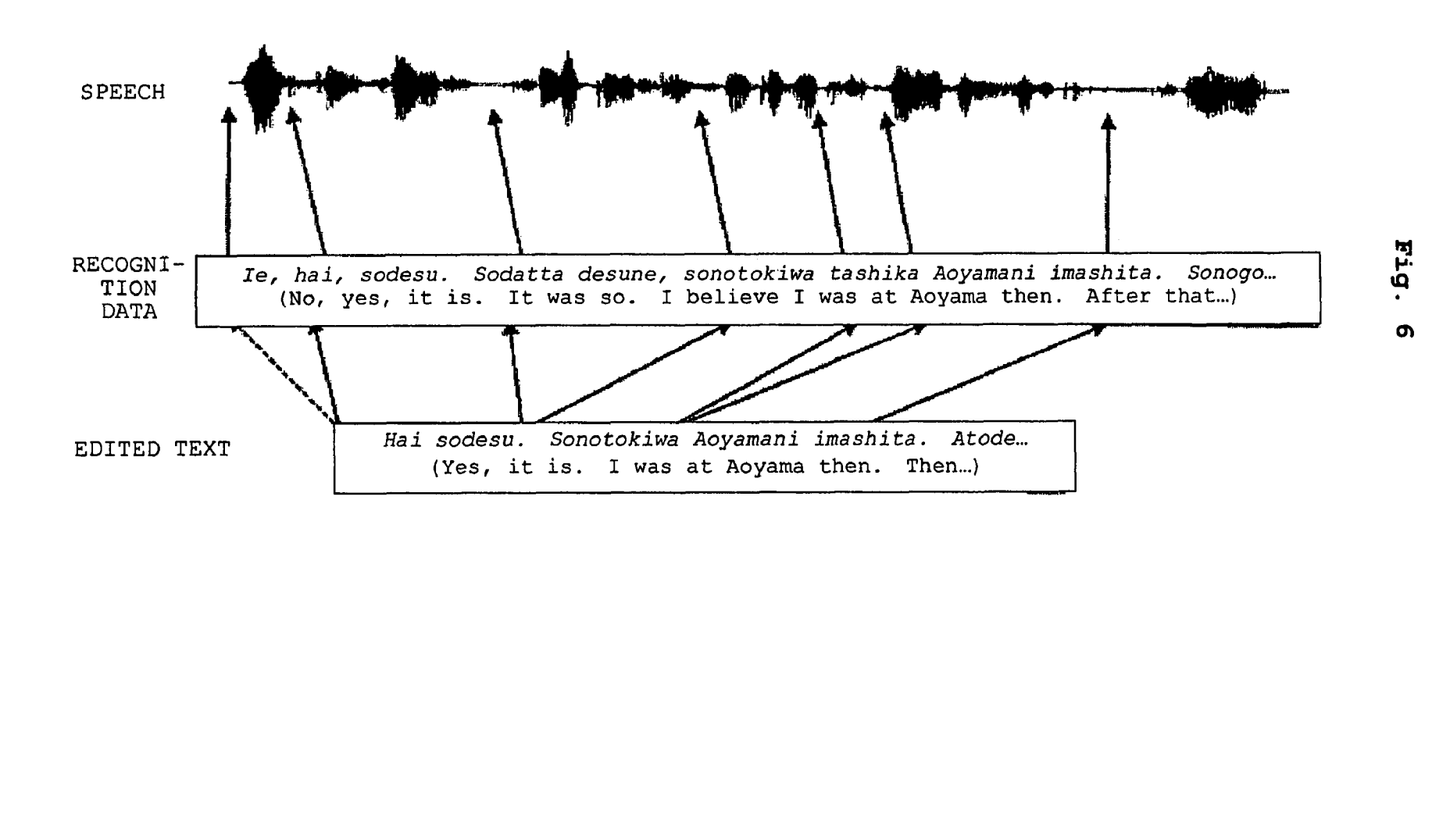
FIG. 6 is a view showing a relationship between a character string in the edited text and speech data according to this embodiment.

FIG. 6 is a view showing a relationship between the character string in the edited text and the speech data, which have been associated with each other in a manner as described above.

As shown in FIG. 6, correspondences for the character strings in the edited text with the character strings in the recognition data (text before editing) in the turn concerned are individually estimated, and the character strings in the edited text can be immediately associated with the speeches based on the correspondences. For example, information indicating the correspondences between these is added as additional data to the edited text, and is stored and held in the storing means such as the main memory 103 and the magnetic disk drive 105 shown in FIG. 2.

The following should be noted. When such a large modification as to reverse a context of the speech is performed in the editing of the text by the text editing unit 35, an accurate correspondence cannot be estimated by means of the DP matching. Therefore, when the speech is reproduced for the turn in which the accumulated distance in the DP matching exceeds a fixed value, the speech is not reproduced locally, but the spoken speeches in the turn will be reproduced entirely.

Moreover, portions from which the correspondence has not been obtained in the DP matching (for example, portions of "ie, (in English, No,)" "soudatta-desune, (It was so)" "tashika (I believe)" and the like in the recognition data of FIG. 6) cannot be reproduced by directly designating ranges thereof. However, when character strings sandwiching any of the ranges are designated and an instruction is given to reproduce speeches thereof, a speech of the sandwiched portion will be reproduced without being skipped.

In such manners as described above, when the speech data is reproduced based on the edited text, it is possible to prevent missing out part of the speech data.

Figure 7:
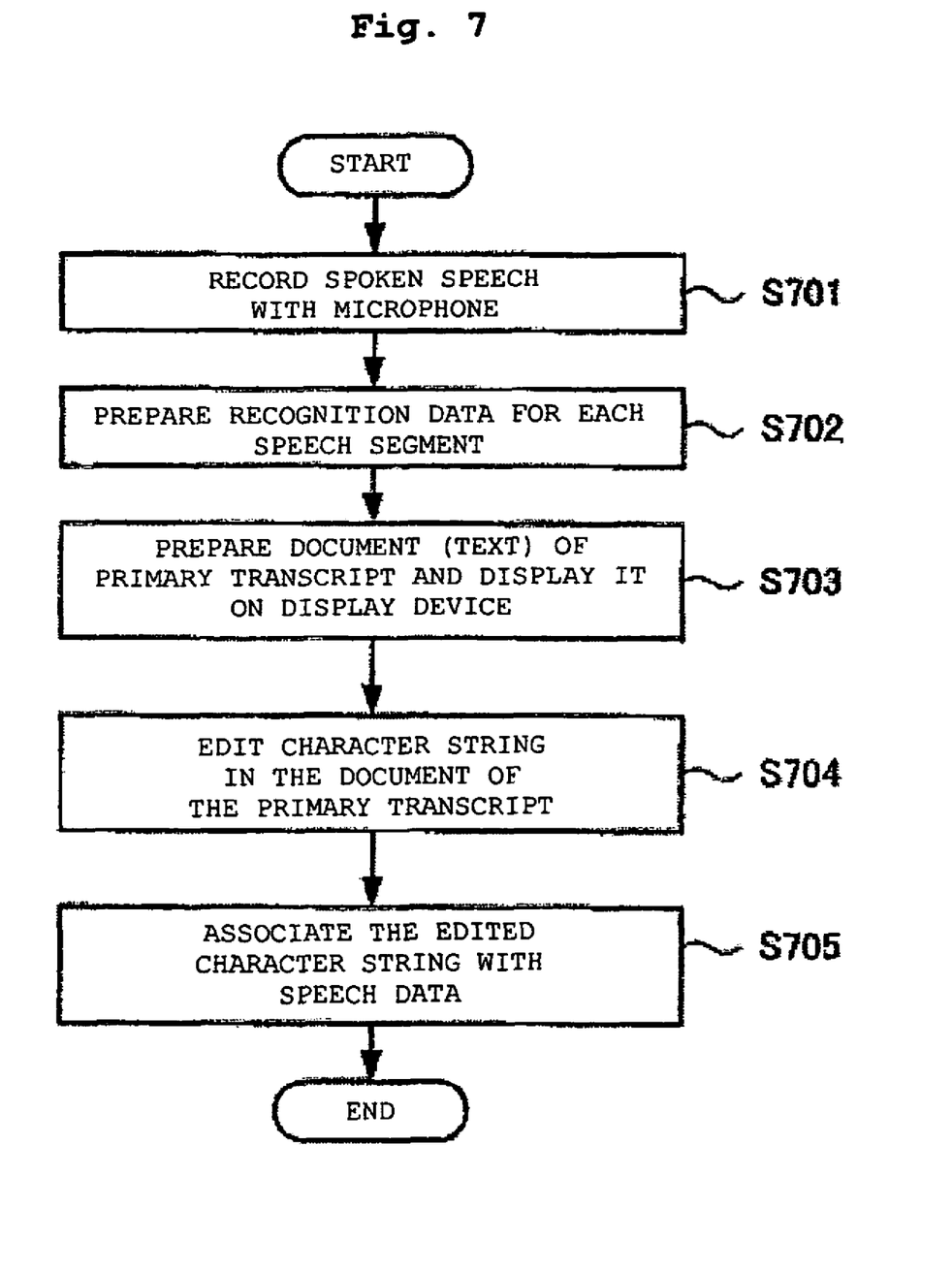
FIG. 7 is a flowchart for explaining a flow of entire processing when the speech recognition system of this embodiment is used for preparing an investigation in a court.

FIG. 7 is a flowchart for explaining a flow of the entire processing when the speech recognition system of this embodiment, which is configured as described above, is used for preparing an investigation in a court.

As shown in FIG. 7, first, the microphones 10 are provided individually for the speakers such as a judge, a prosecutor, a lawyer and a witness, and the speeches spoken by the respective speakers are recorded by these microphones 10 for the separate channels (Step 701). The recorded speeches are subjected to AD conversion and stored in the speech data storage unit 31.

Next, the speech recognition is performed on the speech data by the speech recognition processing unit 32, and the recognition data is prepared for each of the speakers (channels) and for each of the speech segments (Step 702). From the prepared recognition data, text sorted into turns of the speeches is prepared by the text preparation unit 33 and displayed as the investigation of the primary transcript on the display device by the output control unit 34 (Step 703).

The steps described thus far are mechanically executed by the system of this embodiment. Accordingly, if the display device is placed on a judge's seat and the like, it is possible to prepare and display the investigation of the primary transcript in realtime in accordance with the proceeding of the court. Attendants at the court, such as the judge, allow the function of the aforementioned output control unit 34 to collectively display the speech contents of turns including a desired keyword or of a specific witness from the investigation of the primary transcript, and can browse the speech contents. Hence, when the speech recognition system of this embodiment is utilized only for this purpose, a system configuration which does not include the text editing unit 35 or the speech correspondence estimation unit 36 is also possible.

On the other hand, when the investigation of the primary transcript thus prepared is modified to prepare a final investigation, first, the text of the investigation of the primary transcript prepared by the text preparation unit 33 is read from predetermined storing means by the output control unit 34, and displayed on the display device (Step 703). A secretary who will prepare the investigation edits character strings in this investigation of the primary transcript according to needs (Step 704). When performing this editing, the secretary can reproduce and listen to speech data of a desired turn by utilizing the function of the aforementioned output control unit 34.

After the character strings in the investigation of the primary transcript are edited, the character strings after editing are associated with the speech data by the speech correspondence estimation unit 36 (Step 705). This association may be executed by an explicit command input by the secretary who is a user, or may be automatically executed by batch processing at update of the edited text or the like. Moreover, the association may be executed individually for each turn in which the character string has been modified, or may be collectively executed for the entire text.

The text of the final investigation thus prepared is stored and held in the predetermined storing means, read from the predetermined storing means by the output control unit 34 as needed, and displayed on the display device. In a similar way to the aforementioned case of the investigation of the primary transcript, the attendants at the court, such as the judge, allow the output control unit 34 to collectively display the speech contents of turns including a desired keyword and of a specified witness from this investigation, and can browse the speech contents. Moreover, the speech data is also associated with the edited character strings in the investigation, and accordingly, it is possible to reproduce and listen to speech data of a desired turn. In such a way, when reading the investigation, it is possible to guess spirits of the speakers and so on by listening to the recorded speech again.

According to the present invention constituted as described above, in order to perform speech recognition for a recorded speech and to output a document (text) in conformity with a predetermined form, a data processing method and system which are suitable to transcribe speeches acquired in special circumstances such as a court and a conference into text, can be realized and provided.

Moreover, according to the present invention, even if an arbitrary modification is made for the text transcribed by the speech recognition, the modified text and the original speeches can be properly associated with each other.

Although the advantageous embodiment of the present invention has been described in detail, it should be understood that various changes, substitutions and alternations can be made therein without departing from spirit and scope of the invention as defined by the appended claims.

What is claimed is:

1. A system for recognizing speech, comprising:
   a plurality of microphones, wherein each of said plurality of microphones is configured to acquire speech input comprising a plurality of speech segments from at least one of a plurality of speakers;
   a speech data storage unit configured to store the acquired speech input comprising the plurality of speech segments;
   a speech recognition processing unit configured to:
      receive at least one signal comprising speech input acquired by at least one of the plurality of microphones;
      identify the plurality of speech segments in the at least one signal;
      recognize a speech in each of the plurality of speech segments to generate a character string for each of the plurality of speech segments; and
      identify which of the plurality of speakers spoke each of the plurality of speech segments;
   a text editing unit configured to edit at least one of the character strings generated by the speech recognition processing unit to generate at least one edited character string; and
   a speech correspondence estimation unit configured to determine to which of the plurality of speech segments the at least one edited character string corresponds, and to store data associating the at least one edited character string with its corresponding speech segment stored in the speech data storage unit.

2. The system for recognizing speech according to claim 1, wherein the character strings for each of the plurality of speakers each comprise text, and wherein the system further comprises an output control unit that reproduces the speech input corresponding to designated recognition data in the text, the recognition data being designated using at least one of the speech segments as a unit.

3. The system for recognizing speech according to claim 2, wherein the plurality of microphones form a plurality of audio channels, and
   the speech recognition processing unit is configured to process speech input acquired by the plurality of microphones for each of the audio channels, and is further configured to, for the character string from each of the audio channels, impart identification information for identifying a speaker associated with the channel.

4. The system for recognizing speech according to claim 3, wherein the output control unit is configured to retrieve, from the text, the character string of one of the speakers specified by the identification information, and to reproduce the speech segment corresponding to the retrieved character string.

5. The system for recognizing speech according to claim 2, wherein the output control unit is configured to retrieve, from the text, a character string including a specific phrase, and to reproduce the speech segment corresponding to the retrieved character string.

6. The system of claim 1, wherein the speech correspondence estimation unit is configured to determine to which speech segment the at least one edited character string corresponds at least in part by comparing the at least one edited character string with at least some of the plurality of character strings.

7. A data processing method for processing speech data by using a computer, the method comprising:
    with the computer, receiving at least one signal comprising speech input comprising a plurality of speech segments acquired by at least one of a plurality of microphones, wherein the at least one of the plurality of microphones is configured to receive at least some of the speech input from at least one of a plurality of speakers, and wherein the acquired speech input comprising the plurality of speech segments is stored in a speech data storage unit;
    with the computer, identifying each of the plurality of speech segments in the at least one signal;
    with the computer, recognizing a speech in each of the plurality of speech segments to generate a character string for each of the plurality of speech segments;
    with the computer, identifying which of the plurality of speakers spoke each of the plurality of speech segments;
    with the computer, receiving an edited character string generated by a user editing one of the character strings;
    with the computer, determining to which of the plurality of speech segments the at least one edited character string corresponds; and
    with the computer, storing data associating the edited character string with the speech segment stored in the speech data storage unit to which it corresponds.

8. The data processing method according to claim 7, wherein recognizing a speech includes:
    recognizing speech input acquired by a plurality of microphones, each of the plurality of microphones receiving speech input from a respective speaker;
    comparing speech powers in respective channels with one another on a time axis, and specifying speech segments for each of the channels; and
    applying the specified speech segments to results of recognizing the speeches in the respective channels, specifying recognition data for speech input of speakers corresponding to the respective channels, and imparting identification information of the speakers to the recognition data.

9. The data processing method of claim 7, wherein the step of determining to which of the plurality of speech segments the at least one edited character string corresponds comprises comparing the at least one edited character string with at least some of the character strings.

10. At least one non-transient computer-readable medium having instructions encoded thereon which, when executed by a computer, cause the computer to perform a method comprising:
    receiving at least one signal comprising speech input comprising a plurality of speech segments acquired from at least one of a plurality of microphones not electrically distinguishable from each other, wherein the at least one of the plurality of microphones receives at least some of the speech input from at least one of a plurality of speakers, and wherein the acquired speech input comprising the plurality of speech segments is stored in a speech data storage unit;
    identifying a plurality of speech segments in the at least one signal;
    recognizing a speech in each of the plurality of speech segments to generate a character string for each of the plurality of speech segments;
    receiving an edited character string generated by a user editing one of the character strings;
    determining to which speech segment the at least one edited character string corresponds; and
    storing data associating the edited character string with a speech segment stored in the speech data storage unit to which it corresponds.

* * * * *